United States Patent Office 3,073,785
Patented Jan. 15, 1963

3,073,785
ELECTRICALLY CONDUCTIVE POLYMERIC
COMPOSITIONS
Rudolph John Angelo, Wilmington, Del., assignor to E. I. du Pont de Nemours and Company, Wilmington, Del., a corporation of Delaware
No Drawing. Filed July 2, 1959, Ser. No. 824,462
13 Claims. (Cl. 252—519)

This invention relates to the preparation of shapeable polymeric compositions, polyimide structures containing particles and to a novel process for the production thereof.

Polyimide structures, particularly structures of the polypyromellitimides, are useful and resistant to degradation at high temperature. As a vehicle for metals or metal salts in the preparation of electrically conductive tapes, luminescent tiles and decorative films, fibers and the like, the polyimides would seem to be ideal. However, the same outstanding physical and chemical properties that would make these metal or salt-containing polymers extremely useful in the form of shaped structures such as films, filaments, tubing, etc., make it extremely difficult to shape the polymers into useful structures by the ordinary methods of extrusion or injection molding.

The object of the present invention is a process for forming particle-containing polyimide shaped structures. Another object is to form transparent structures containing particles of less than 1 micron. Other objects will appear hereinafter.

The objects are accomplished by first forming a composition containing at least one polyamide-acid having an inherent viscosity of at least 0.1, preferably 0.3–5.0; then reacting the polyamide-acid composition with a salt having the formula:

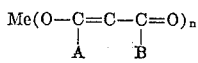

wherein Me is a metal ion selected from the group consisting of cupric, ions of group II metals,[1] ions of group III metals [1] having an atomic number of at least 13, ions of group IV metals [1] having an atomic number of at least 40 ions of period 3, Series 4 metals [1] having an atomic number of at least 24; A and B are selected from the group consisting of alkyl, aryl, alkoxy and aryloxy; and $n$ is an integer equal to the valence of the metal;

to form a chelated metal salt of the polyamide-acid; then shaping the metal salt of the polyamide-acid into a structure; and, thereafter, converting the structure to a polyimide structure containing particles of the metal or a salt of the metal.

The process may be divided into four steps:
(1) Forming the polyamide-acid composition.
(2) Converting the polyamide-acid into a chelated metal salt thereof.
(3) Shaping the polyamide-acid salt into a useful structure.
(4) Converting the polyamide-acid salt to a metal-containing polyimide.

[1] Groups and Period of Mendeleef's Periodic Table of the Elements, Chemical Engineers' Handbook (2nd ed.), edited by J. H. Perry, published by McGraw-Hill Book Company.

Each of these steps will be discussed separately in subsequent portions of this specification.

FORMING POLYAMIDE-ACID COMPOSITIONS

The process for preparing the polyamide-acid composition involves reacting at least one organic diamine having the structural formula:

$$H_2N-R'-NH_2$$

wherein R' is a divalent radical containing at least 2 carbon atoms, the two amino groups of said diamine each attached to separate carbon atoms of said divalent radical; with at least one tetracarboxylic acid dianhydride having the structural formula:

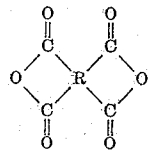

wherein R is a tetravalent radical containing at least 2 carbon atoms, no more than 2 carbonyl groups of said dianhydride attached to any one carbon atom of said tetravalent radical; in an organic polar solvent under anhydrous conditions while maintaining the temperature throughout the reaction below 60° C., preferably below 50° C.

It should be understood that it is not necessary that the polymeric component of the composition be composed entirely of the polyamide-acid. This is particularly true when conversion to the polyimide is contemplated subsequent to shaping the polyamide-acid salt. To retain its shapeability as the salt, the polymeric component of the composition should contain at least 50% of the polyamide-acid; the remainder may be the more difficult to mold conversion product. Thus, while the aforementioned process for preparing the polyamide-acid should be conducted below 50° C. to provide substantially 100% of the polyamide-acid, temperatures up to 60° C. will still provide a composition containing at least 50% of the polyamide-acid in the polymeric component and, in the case of some polyamide-acids, will provide 100% of the polyamide-acid. It is also within the scope of the present invention to convert a portion of the polyamide-acid to the polyimide by heat, treatment with an acetic anhydride-pyridine mixture or treatment with a carbodiimide, e.g., dicyclohexylcarbodiimide. However, the polymeric component of the composition at the end of this step should contain at least 50% of the unconverted polyamide-acid. It should be understood that after the polyamide-acid has been formed, it may be necessary to warm the composition in order to insure substantially complete dissolution of the polyamide-acid in the solvent.

The preferred process involves premixing equimolar amounts of the diamine and the dianhydride as dry solids and then adding the mixture, in small proportions and with agitation, to the organic polar solvent. Premixing the ingredients and then adding them in small proportions to the solvent provides relatively simple means for controlling the temperature and the rate of the process. Since the reaction is exothermic and tends to accelerate very rapidly, it is important to regulate the additions to maintain the reaction temperature below 60° C. However, the order of addition may be varied within the scope of the present invention. After premixing the diamine and the dianhydride, the solvent may be added to the mixture with agitation. It is also possible to dissolve the diamine in the organic polar solvent while agitating and to add the dianhydride slowly to control the reaction temperature. Ordinarily, in this latter process the last portion of the dianhydride is added with part of the organic polar solvent. Another possible method involves adding the reactants to the solvent in small proportions, not as a premixture, but alternately; first diamine, then dianhydride, then diamine, etc. In any event, it is advisable to agitate the solution polymerization system after the additions are completed until maximum viscosity denoting maximum polymerization is obtained.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. However, up to 5% excess of either the diamine or the dianhydride may be used in the process. More than 5% excess of either reactant results in an undesirably low molecular weight polyamide-acid. It is desirable to use 1-3% excess of either reactant, preferably the dianhydride, to control the molecular weight of the polyamide-acid. Besides using an excess of one reactant to limit the molecular weight of the polyamide-acid, a chain terminating agent such as phthalic anhydride may be used to "cap" the ends of the polymer chains.

In the preparation of the polyamide-acid compositions, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent. The viscosity of the polymer solution is measured relative to that of the solvent alone and the inherent $$\text{viscosity} = \frac{\text{natural logarithm} \frac{\text{viscosity of solution}}{\text{viscosity of solvent}}}{C}$$

where C is the concentration expressed in grams of polymer per 100 milliliters of solution. As shown in the polymer art, inherent viscosity is directly related to the molecular weight of the polymer.

The quantity of organic polar solvent used in preparing the polyamide-acid composition need only be sufficient to dissolve the diamine and to provide, with the ultimate polymeric salt component dissolved therein, a sufficiently low viscosity for forming the composition into shaped articles. It has been found that the most successful results are obtained when the solvent represents at least 85% of both the polyamide-acid solution and final polymeric salt solution. That is, the solution should contain 0.05–15%, preferably 5–10% of the polymeric component.

The starting materials for forming the polyamide-acid composition are organic diamines and tetracarboxylic acid dianhydrides. The organic diamines are characterized by the formula:

$$H_2N-R'-NH_2$$

wherein R', the divalent radical, may be selected from the following groups: aromatic, aliphatic, cycloaliphatic, combination of aromatic and aliphatic, and substituted groups thereof. The most useful diamines are the primary diamines. However, secondary diamines such as piperazine may be used to produce polyamide-acid salt compositions where conversion into the polyimide is not contemplated. The preferred R' groups in the diamines are those containing at least 6 carbon atoms characterized by benzenoid unsaturation. Among the diamines which are suitable for use in the present invention are: meta-phenylene diamine, para-phenylene diamine; 4,4'-diamino-diphenyl propane; 4,4'-diamine-diphenyl methane; benzidine; 4,4'-diamino-diphenyl sulfide; 4,4'-diamino-diphenyl sulfone; 3,3'-diamino-diphenyl sulfone; 4,4' - diamino-diphenyl ether; 1,5 - diamino-naphthalene, 3,3'-dimethyl-4,4'-biphenyl diamine; 3,3'-dimethoxy benzidine; 2,4 - bis(beta - amino-t-butyl)toluene; bis-(para-beta-amino-t-butyl-phenyl)ether; bis - (para-beta-methyl-delta-amino-pentyl)benzene; bis-para - (1,1 - dimethyl-5-amino-pentyl)benzene; 1-isopropyl-2,4-metaphenylene diamine; m-xylylene diamine; p-xylylene diamine; di(para-amino-cyclohexyl)methane; hexamethylene diamine; heptamethylene diamine; octamethylene diamine; nonamethylene diamine; decamethylene diamine; diamino-propyl tetramethylene diamine; 3-methylheptamethylene diamine; 4,4-dimethylheptamethylene diamine; 2,11-diamino dodecane; 1,2-bis-(3-amino-propoxy ethane); 2,2-dimethyl propylene diamine; 3-methoxy-hexamethylene diamine; 2,5 - dimethylhexamethylene diamine; 2,5-dimethylheptamethylene diamine; 3-methylheptamethylene diamine; 5 - methylnonamethylene diamine; 2,17 - diamino-eicosadecane; 1,4-diamino-cyclohexane; 1,10-diamino-1,10-dimethyl decane; 1,12-diamino-octadecane;

$$H_2N(CH_2)_3O(CH_2)_2O(CH_2)_3NH_2$$
$$H_2N(CH_2)_3S(CH_2)_3NH_2$$
$$H_2N(CH_2)_3N(CH_3)(CH_2)_3NH_2$$

piperazine; and mixtures thereof. Particularly desirable mixtures include: 4,4'-diamino-diphenyl methane and para-phenylene diamine; 4,4'-diamino-diphenyl propane and meta-phenylene diamine; and 4,4'-diamino-diphenyl propane and benzidine; benzidine and meta-phenylene diamine; meta-phenylene diamine, para-phenylene diamine and benzidine; meta-phenylene diamine and para-phenylene diamine; 4,4'-diamino-diphenyl ether and benzidine; 4,4'-diamino-diphenyl sulfide and benzidine; and 4,4'-diamino-diphenyl sulfide and 4,4'-diamino-diphenyl ether.

The tetracraboxylic acid dianhydrides are characterized by the following formula:

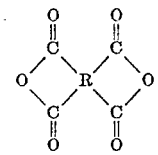

wherein R is a tetravalent radical selected from the group consisting of aromatic, aliphatic, cycloaliphatic, combination of aromatic and aliphatic, and substituted groups thereof. However, the preferred dianhydrides are those in which the R groups have at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

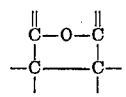

Illustrations of dianhydrides suitable for use in the present invention include: pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, 3,4-dicarboxyphenyl sulfone dianhydride, perylene 3,4,9,10-tetracarboxylic acid dianhydride, bis(3,4-dicarboxyphenyl) ether dianhydride, etc.

The solvents useful in the solution polymerization process for synthesizing the polyamide-acid compositions are the organic polar solvents having a dipole moment whose functional groups do not react with the diamines or the dianhydrides. Besides being inert to the system and being a solvent for the product, the organic polar solvent must be a solvent for at least one of the reactants, preferably for both of the reactants. The normally liquid organic polar solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid salts and/or the shaped articles of the polyamide-acid salts by evaporation, displacement or diffusion. Other typical compounds of this useful class of solvents are: N,N-diethylformamide, N,N-diethylacetamide, N,N-dimethylmethoxy acetamide, etc. Other organic polar solvents which may be used in the present invention are: dimethylsulfoxide, diethylsulfoxide, N-methyl-2-pyrrolidone, pyridine, picoline, lutidine, dimethylsulfone, diethylsulfone, dipropylsulfone, hexamethylphosphoramide, tetramethylene sulfone, dimethyltetramethylene sulfone, dimethoxytetramethylene sulfone. The solvents can be used alone, in combinations of solvents, or in combination with non-solvents such as benzene, benzonitrile, dioxane, butyrolactone, xylene, toluene and cyclohexane. However, the addition of water cannot be tolerated. It is necessary that the process be conducted in an essentially anhydrous condition.

CONVERTING INTO POLYAMIDE-ACID SALT AND SHAPING THE SALT

The conversion of the polyamide-acid, which comprises at least 50% of the polymeric component of the composition produced in the first step, is accomplished by adding a solution in an organic polar solvent of a salt having the formula:

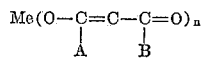

Wherein Me is a metal ion selected from the group consisting of cupric, ions of group II metals,[1] ions of group III metals[1] having an atomic number of at least 13, ions of group IV metals[1] having an atomic number of at least 40 and ions of period 3, Series 4 metals having an atomic number of at least 24; A and B are selected from the group consisting of alkyl, aryl, alkoxy and aryloxy; and $n$ is an integer equal to the valence of the metal.

These salts may be described as metal complexes. Upon reaction with the polyamide-acid, they form chelated metal salts of the acid. Chelation of the metal serves to prevent uncontrollable cross-linking of the substantially linear, shapeable polyamide-acid salt. The metal complex is preferably added as part of a solution in an organic solvent. The organic solvent is preferably the same as that used previously in the preparation of the polyamide-acid but may be any of those listed previously, which solvent is a solvent for the particular metal salt under consideration.

The most useful salts are the acetylacetonates, i.e., wherein A and B in the formula are both methyl groups. The alkyl acetoacetates such as ethyl acetoacetate and butyl acetoacetate are also important and form, along with the acetylacetonates, a preferred group. In general, the A and B groups should contain no more than 10 carbon atoms, e.g., naphthyl.

The metal ions in the complexed salts are preferably selected from a group that includes cupric ion and ions of magnesium, calcium, zinc, strontium, cadmium, barium, mercury, aluminum, tin, lead, thorium, chromium, manganese, ion, cobalt and nickel. The formula of a typical complexed salt, the ferric acetylacetonate is reproduced below:

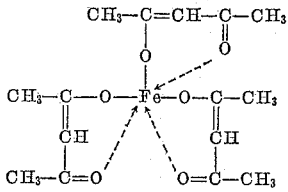

The salts, such as the acetylacetonates, may be prepared by reaction of a metal salt of a weak acid and acetylacetone and added in an appropriate solvent such as pyridine. Alternately, the salt may be formed in situ by adding the salt of a weak acid, preferably the metal acetate, along with the beta-ketone such as the acetylacetone and an organic polar solvent, preferably pyridine, to the polyamide-acid composition.

In the preparation of the complexed salt, the acetate is preferred as the starting material. However, salts derived from other monocarboxylic or polycarboxylic acids may be used. Thus, the list would include salts of a fatty acid (e.g., formic, acetic or propionic acid), a dicarboxylic aliphatic acid (e.g., oxalic or succinic acid), an unsaturated acid (e.g., maleic or fumaric acid), an ether acid (e.g., diglycolic or dilactic acid), a hydroxy acid (e.g., tartaric or citric acid), aromatic acid (e.g., benzoic or phthalic acid), or carbonic acid.

The reaction between polyamide-acid and the complexed metal salt is permitted to take place while maintaining the temperature within a range of 0°–50° C. During this reaction, rapid stirring and the addition of more solvent or pyridine, lutidine, picoline, acetylacetone or a beta-ketonic type compound such as ethyl acetoacetate may be used to clear any gel or insoluble matter that form in the polyamide-acid salt solution.

The degree of substitution of metal for hydrogen achieved in this step depends upon the amount of the complexed metal salt added and the temperature and time permitted for the reaction. For the purpose of the present invention, a substitution of 0.1 mole–2 moles of metal per polymer unit can be used successfully. Thus, the shapeable polymeric composition at this stage may be described as one comprising 0.05–15% by weight of at least one polyamide-acid salt having the recurring unit:

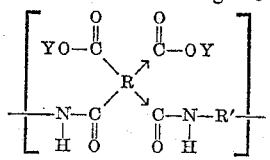

wherein → denotes isomerism; wherein R is a tetravalent radical containing at least six carbon atoms characterized by benzenoid unsaturation, the four carbonyl groups of each polyamide-acid unit being attached to separate carbon atoms and each pair of carbonyl groups being directly attached to adjacent carbon atoms in said tetravalent radical; wherein R' is a divalent radial containing at least 2 carbon atoms, the amide groups of adjacent polyamide-acid salt units each attached to separate carbon atoms of said divalent radical; and wherein Y is an ion selected from the group consisting of hydrogen and a chelated metal ion, the minimum substitution of metal per polymer unit being 0.1 mole, the chelated metal ion having the formula:

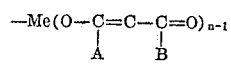

wherein Me is a metal ion selected from the group consisting of cupric, ions of group II metals,[1] ions of group III metals[1] having an atomic number of at least 13, ions of group IV metals[1] having an atomic number of at least 40 and ions of period 3, Series 4 metals[1]

See footnote 1, column 1.

See footnote 1, column 1.

having an atomic number of at least 24; A and B are selected from the group consisting of alkyl, aryl, alkoxy and aryloxy; and *n* is an integer equal to the valence of the metal dissolved in 85–99.95% of an organic polar solvent; said polyamide-acid salt having an inherent viscosity of at least 0.1.

The resulting viscous polyamide-acid salt solution, which should contain preferably at least 85% solvent, may be used as such as a coating or an impregnant, i.e., without converting to the polyimide plus the free metal. However, in the preferred mode of operation, the polyamide-acid salt is shaped at this stage into a useful structure by molding, casting or extrusion as a prelude to conversion into the polyimide plus free metal. The viscosity of the salt composition should be sufficiently low for forming the composition into shaped articles. The viscosity can be controlled by the addition of solvent to or removal of it from the viscous dope. The shaped structure or coated structure is then dried by exposure to air at the boiling temperature of the solvent for a short period.

CONVERTING INTO POLYIMIDE

The shaped articles composed of at least 50% of a chelated metal salt of a polyamide-acid may then be converted to the respective polyimide shaped articles. In the discussion that follows, a substitution of 1 mole of metal per polymer unit will be illustrated, i.e., 1 mole of metal per two carboxyl units of polyamide-acid. However, this is not meant to be limitative but only to simplify the discussion.

One process involves converting the polyamide-acid salts having the recurring units of the following structural formula:

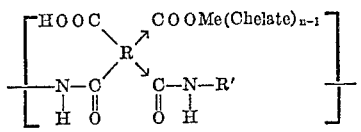

wherein → denotes isomerism to polyimides plus free metal by heating above 50° C. Heating serves to convert pairs of amide and metal-substituted carboxylic acid groups to imide groups plus free metal particles, the reformed beta-ketone volatilizing in the process. Heating may be conducted for a period of a few seconds to several hours. It is preferred to have gradual temperature increases up to and within the conversion range in order to discourage the tendency of void and bubble formation within the polyimides as a result of the water vapor and ketone vapor given off and to avoid crystallization or embrittlement. It has also been found that after the polyamide-acid salt has been converted to the polyimide in accordance with the above-described heat conversion, if the polyimide is further heated to a temperature of 300°–500° C. for a short interval (15 seconds to 2 minutes), improvements in the thermal and hydrolytic stabilities of the metal-containing polyimide structure are obtained.

Other processes for conversion may involve treatment with one or more chemicals which serve to dehydrate the polyamide-acid salt to form the polyimide plus metal and which also act as effective cyclyzing agents.

If it is desired, the chelated metal ion may be converted by the addition of an appropriate chemical to a metal salt simultaneously with the conversion of the polyamide-acid units into the polyimide so that the final article contains metal salt particles rather than particles of the free metal.

The presence of polyimides is evidenced by their insolubility in cold basic reagents as opposed to the rapid solubility of the polyamide-acid. Their presence is also apparent if the polyamide-acid salts are scanned with infrared during conversion to the polyimide. The spectra initially show a predominating absorption band at ca. 3.1 microns due to the NH bond. This band gradually disappears, and as the reaction progresses, the polyimide absorption band, a doubleton, appears at ca. 5.64 and 5.89 microns. When conversion is completed the characteristic polyimide band predominates.

It is surprising to note the final polyimide structures containing metal particles may be transparent and may not show diffraction by the incorporated particles nor may the particles be visible under an ordinary microscope. This means that the particles therein have dimensions smaller than the wave length of light, i.e., the particles do not have dimensions greater than 0.8 micron. In any event, the process of the present invention makes it possible to provide polyimide structures containing metal particles up to about 1 micron. Any process which would attempt to incorporate finely-divided or powdered-metal particles in a final structure, if such could be accomplished with polyimide structures, would provide structures containing particles larger than 1 micron.

The invention will be more clearly understood by referring to the examples which follow, Example 1 representing the best mode contemplated for practicing the present invention. The examples are all directed to the formation of particle-containing polyimide films for use as decorative or electrically conductive tapes, packaging materials, etc. However, decorative or transparent electrically conductive filaments or a variety of novel molded products can also be prepared by the present invention.

*Example 1*

4,4′-diamino-diphenyl methane, 11.6 grams (0.058 mole) was dissolved in 150 milliliters of dimethylformamide. To this solution, 12.7 grams (0.058 mole) of pyromellitic dianhydride was added portionwise with agitation while the solution was externally cooled with circulating water at approximately 15° C. A viscous dope formed which was further diluted with 30 milliliters of dimethylformamide to give a solution containing 12% by weight of the polyamide-acid. The inherent viscosity was 2 (0.5% solution in dimethylformamide).

A 1% solution of copper acetylacetonate in pyridine, 3.2 grams (0.00123 mole of copper) was added with stirring to 20.0 grams of the 12% dimethylformamide solution of the polyamide-acid (0.0058 mole of polymer unit). Rapid stirring and the addition of 2.0 milliliters of acetylacetone yielded a viscous blue-green mixture.

The mixture was centrifuged and the solution was cast onto a glass plate using a doctor knife having a 40-mil opening. The film was dried at 130° C. for 30 minutes in air in a forced draft oven. The film was stripped from the glass plate. The film, which was the chelated copper salt of the polyamide-acid, was tough. The film contained 2.2% by weight of copper, approximately 0.5 mole per carboxyl unit.

The polyamide-acid salt film was then heated in a vacuum oven under a nitrogen atmosphere at a temperature of 300° C. for 30 minutes. A tough clear film brown in color was obtained. The film could be flexed without breaking. This film was shown to be a polyimide film containing copper particles having their greatest dimension of about 0.8 micron by the following tests.

By ordinary chemical analysis, the film was found to contain 3.0% copper. X-ray analysis showed strong lines characteristic of copper at 1.28 angstrom units, 1.82 angstrom units and 2.10 angstrom units. Strong infrared absorption was obtained by conventional techniques at 5.62 microns and 5.80 microns, characteristic of the carbonyl groups in polyimides showing that conversion to polyimide had occurred.

The properties of the film measured at room temperature are given below:

Chemical analysis:
  Percent copper_____ 3.0
Physical properties:
  Tensile modulus_____ 430,000 pounds/square inch
  Elongation_____ 5.0%
  Tensile strength_____ 11,900 pounds/square inch
Electrical properties:
  Dielectric constant_____ 3.6
  Dissipation factor_____ 0.004–0.01
  Volume resistivity_____ $8 \times 10^{12}$ ohms-cm.

*Examples 2–3*

A 10% solution of the polyamide-acid of 4,4'-diamino-diphenyl methane and pyromellitic dianhydride in dimethylformamide was prepared as in Example 1. To 10 grams of this solution, 10 milliliters of a 1% solution of nickel acetylacetonate in dimethylformamide was added slowly while stirring. As the solution of the nickel acetylacetonate complex was added, the viscosity of the reaction mixture gradually increased. A small quantity (5 drops) of acetylacetone was then added. The mixture was degassed by applying a vacuum and then cast on a glass plate to form a film. After drying at a temperature of 130° C. for 30 minutes, the plate was washed in water to yield a clear, pale green, tough film. The film was analyzed and found to contain 7% by weight of nickel which amounts to a substitution of about 0.3 mole of nickel per polyamide-acid unit.

In an alternate procedure, Example 3, a solution of 0.295 gram of nickel acetate in 5 milliliters of pyridine and 1 milliliter of acetylacetone was added slowly while stirring to 8.7 grams of a 12% solution of the polyamide-acid of 4,4'-diamino-diphenyl methane/pyromellitic anhydride in dimethylformamide, the polyamide-acid prepared as in Example 1. A few drops of pyridine and acetylacetone were added to maintain the fluidity of the reaction mixture. The mixture was cast onto a glass plate using a doctor knife having a 15-mil opening. The film was then stripped from the plate and dried in an air oven for 10 minutes. A light green, tough film was obtained.

The films prepared above were composed of the chelated nickel salt of the polyamide-acid. They were heated in a vacuum oven under a nitrogen atmosphere at a temperature of 300° C. for 30 minutes. Transparent brown films having a slight metallic luster resulted in both cases. Upon analysis, these films were found to be polyimide films containing particles of free nickel.

*Example 4*

A 15% solution of the polyamide-acid of 4,4'-diamino-diphenyl methane and pyromellitic dianhydride in dimethylformamide was prepared as in Example 1. To 10.1 grams of this solution, 0.78 gram of ferric acetylacetonate was added. Two milliliters of acetylacetone was then added and the resulting fluid dope was cast on the surface of a film previously cast from a solution of the polyamide-acid alone (containing no iron salt). An outer layer of the polyamide-acid alone was then cast on the surface of the layer containing the iron salt. The resulting laminate was dried at a temperature of 120° C. for 40 minutes.

The film of the iron salt of polyamide-acid was removed from between the two layers of polyamide-acid alone and then heated for 1.5 hours at a temperature of 350° C. A black film having magnetic properties was obtained. Infrared analysis indicated the conversion of the polyamide-acid to polyimide by absorption at 5.62–5.80 microns. X-ray analysis revealed sharp lines at 1.48, 2.55 and 2.97 angstrom units indicating the presence of magnetite particles.

*Example 5*

A solution of 0.41 gram (0.0017 mole) of chromic acetate hydrate dissolved in a mixture of 5 milliliters of pyridine and 1 milliliter of acetylacetone was added slowly with stirring to 8.7 grams of a 12% solids solution of the polyamide-acid from diamino-diphenyl methane/pyromellitic anhydride in dimethylformamide, the latter prepared as in Example 1. The viscous dope obtained was cast with a 20-mil doctor knife opening on a glass plate and dried for 15 minutes at 120° C. A dull green, tough, flexible, transparent film was obtained.

The film was then heated for 90 minutes at 300° C. in an air oven. At the end of this time, the film still retained its green color. After a further heat treatment for 5 minutes at 400° C., a dark brown polyimide film containing chromium particles was obtained.

*Example 6*

A solution of 0.62 gram of cobaltous acetate tetrahydrate dissolved in a mixture of 5 milliliters of pyridine and 1 milliliter of acetylacetone was added slowly with stirring to 8.7 grams of a 12% solids solution of the polyamide-acid from diamino-diphenyl methane/pyromellitic anhydride in dimethylformamide, the latter prepared as in Example 1. The reaction mixture was cast at a doctor knife opening of 20 mils on a glass plate and dried at 120° C. for 15 minutes to yield a tough, flexible, transparent film with a violet color.

The film was then heated at 300° C. for 90 minutes in an air oven, during which time the color of the film proceeded from a yellowish brown to brown and finally to black.

*Example 7*

A solution of 0.31 gram (.001 mole) of manganese acetate tetrahydrate in a mixture of 5 milliliters of pyridine and 1 milliliter of acetylacetone was added slowly with stirring to 8.7 grams of 12% solids solution of the polyamide-acid from diamino-diphenyl methane/pyromellitic anhydride in dimethylformamide, the latter prepared as in Example 1. The resulting dope was cast at a doctor knife opening of 20 mils on a glass plate and then dried at 120° C. for 15 minutes to produce a colorless, tough, transparent film.

The manganese salt of the polyamide-acid was then heated for 90 minutes at 300° C. A dark brown polyimide film containing manganese particles was obtained.

*Example 8*

A solution of 0.28 gram of zinc acetate dihydrate in a mixture of 5 milliliters of pyridine and 1 milliliter of acetylacetone was added slowly with stirring to 8.7 grams of 12% solids solution in dimethylformamide of the polyamide from diamino-diphenyl methane/pyromellitic anhydride. The resulting dope was cast at a doctor knife opening of 20 mils on a glass plate, then dried at 120° C. for 15 minutes. An almost colorless, tough film of the zinc salt of the polyamide-acid was produced.

*Example 9*

A solution of .54 gram (.0025 mole) of magnesium acetate tetrahydrate dissolved in 5 milliliters of pyridine and 1 milliliter of acetylacetone was added slowly with stirring to 8.7 grams of a 12% solution of the polyamide-acid from diamino-diphenyl methane/pyromellitic anhydride in dimethylformamide. The reaction mixture so obtained was cast at a doctor knife opening of 20 mils on a glass plate, dried at 120° C. for 15 minutes to produce a clear, colorless film of the magnesium salt of the polyamide-acid.

*Example 10*

A solution of mercuric acetate was formed by dissolving 1.21 grams of mercuric acetate in 5 milliliters of pyridine. The pyridine solution was added slowly with stirring to 10.56 grams of a 15% solids polyamide-acid solution in dimethylformamide. Acetylacetone was added and the solution was then stirred with a high speed stirrer. Following this, the solution was centrifuged and films were cast using a 10 mil and a 25 mil doctor knife opening; the films were dried at 120° C. for 10 minutes, stripped and dried for a further half hour. Concentration of mercury in the films of the mercury salt of the polyamide-acid was calculated to be 1 mercuric ion per 2 carboxyl groups.

What is claimed is:

1. A shapeable polymeric composition consisting essentially of 0.05–15% by weight of at least one polyamide-acid salt having the recurring unit:

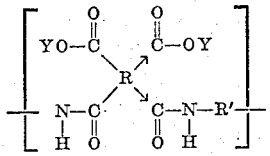

wherein → denotes isomerism; wherein R is a tetravalent radical containing at least six carbon atoms characterized by benzenoid unsaturation, the four carbonyl groups of each polyamide-acid unit being attached to separate carbon atoms and each pair of carbonyl groups being directly attached to adjacent carbon atoms in said tetravalent radical; wherein R' is a divalent radical containing at least 2 carbon atoms, the amide groups of adjacent polyamide-acid salt units each attached to separate carbon atoms of said divalent radical; and wherein Y is an ion selected from the group consisting of hydrogen and a chelated metal ion, the minimum substitution of metal per polymer unit being 0.1 mole, the chelated metal ion having the formula

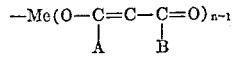

wherein Me is a metal ion selected from the group consisting of cupric, ions of group II metals, ions of group III metals having an atomic number of at least 13, ions of group IV metals having an atomic number of at least 40 and ions of period 3, Series 4 metals having an atomic number of at least 24; A and B are selected from the group consisting of alkyl, aryl, alkoxy and aryloxy; and $n$ is an integer equal to the valence of the metal dissolved in 85–99.95% of an organic polar solvent, said solvent being inert to the system and being a solvent for at least one of the reactants; said polyamide-acid salt having an inherent viscosity of at least 0.1.

2. A shapeable polymeric composition as in claim 1 wherein R is derived from pyromellitic dianhydride.

3. A shapeable polymeric composition as in claim 1 wherein R' is derived from 4,4'-diamino-diphenyl methane.

4. A shapeable polymeric composition as in claim 1 wherein said metal is iron.

5. A shapeable polymeric composition as in claim 1 wherein said metal is copper.

6. A process which comprises reacting at least one diamine having the structural formula:

$$H_2N—R'—NH_2$$

wherein R' is a divalent radical containing at least two carbon atoms, with at least one tetracarboxylic acid dianhydride having the structural formula:

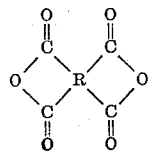

wherein R is a tetravalent radical containing at least six carbon atoms characterized by benzenoid unsaturation, the four carbonyl groups being attached to separate carbon atoms and each pair of carbonyl groups being attached to adjacent carbon atoms in the R radical, in an organic polar solvent, said solvent being inert to the system and being a solvent for at least one of the reactants under substantially anhydrous conditions while maintaining the temperature throughout the reaction below 60° C. to form a polymeric composition containing at least 50% polyamide-acid having the recurring unit

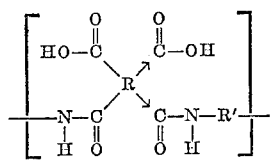

wherein → denotes isomerism and wherein R and R' are as aforesaid; reacting said polymeric composition with a metal salt having the formula:

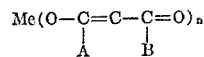

wherein Me is a metal ion selected from the group consisting of cupric, ions of group II metals, ions of group III metals having an atomic number of at least 13, ions of group IV metals having an atomic number of at least 40 and ions of period 3, Series 4 metals having an atomic number of at least 24; A and B are selected from the group consisting of alkyl aryl, alkoxy and aryloxy; and $n$ is an integer equal to the valence of the metal, to form a polyamide-acid salt composition containing 0.1–2 moles of metal per polymer unit; forming said polyamide-acid salt composition into a shaped structure; and heating said structure at a temperature above 50° C. to convert said polyamide-acid salt structure to a polyimide structure containing particles.

7. A process as in claim 6 wherein the structure is heated further to a temperature of 300° C.–500° C. for at least 15 seconds.

8. A process as in claim 6 wherein said diamine is 4,4'-diamino-diphenyl methane.

9. A process as in claim 6 wherein said dianhydride is pyromellitic dianhydride.

10. A process as in claim 6 wherein said metal salt is ferric acetylacetonate.

11. A process as in claim 6 wherein said metal salt is cupric acetylacetonate.

12. A process as in claim 6 wherein said metal salt is cobalt acetylacetonate.

13. A process as in claim 6 wherein said metal salt is nickel acetylacetonate.

References Cited in the file of this patent

UNITED STATES PATENTS

| | | |
|---|---|---|
| 2,638,523 | Rubin | May 12, 1953 |
| 2,683,673 | Silversher | July 13, 1954 |
| 2,710,853 | Edwards et al. | June 14, 1955 |
| 2,712,543 | Gresham et al. | July 5, 1955 |
| 2,731,447 | Gresham et al. | Jan. 17, 1956 |
| 2,795,680 | Peck | June 11, 1957 |
| 2,864,774 | Robinson | Dec. 16, 1958 |
| 2,867,609 | Edwards et al. | Jan. 6, 1959 |
| 2,880,230 | Edwards et al. | Mar. 31, 1959 |
| 2,901,722 | Arnott | Aug. 25, 1959 |

FOREIGN PATENTS

| | | |
|---|---|---|
| 570,858 | Great Britain | July 25, 1945 |